Figure 1:
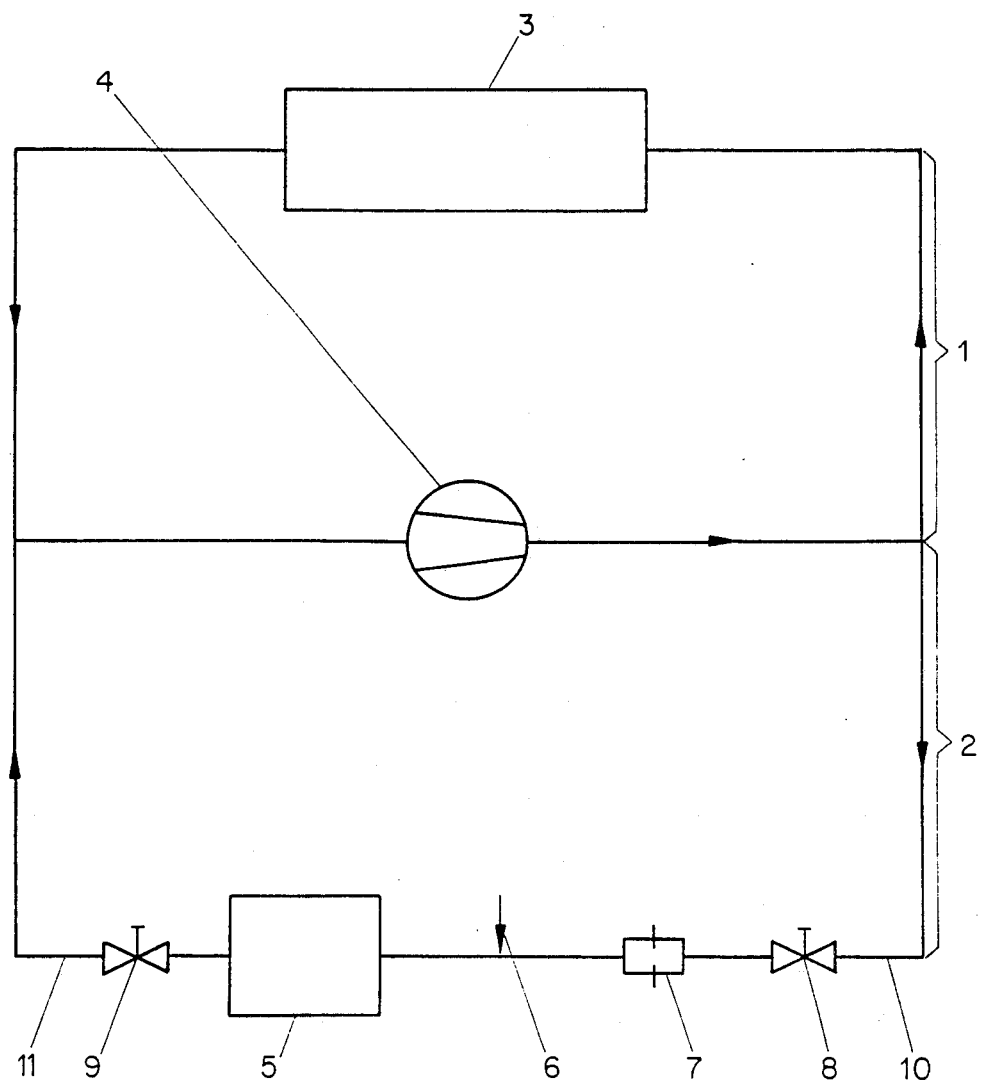

United States Patent [19]

Kuhn et al.

[11] Patent Number: 4,655,930
[45] Date of Patent: Apr. 7, 1987

[54] PROCESS FOR THE REMOVAL OF ELEMENTAL OXYGEN BY MEANS OF A REDUCING AGENT IN A COOLANT CIRCULATING IN ONE OR MORE CLOSED CIRCULATIONS, AND APPARATUS FOR THE REMOVAL OF ELEMENTAL OXYGEN

[75] Inventors: Albert Kuhn, Ennetbaden; Reinhard Müller, Baden, both of Switzerland

[73] Assignee: BBC Brown, Boveri & Company, Limited, Baden, Switzerland

[21] Appl. No.: 823,664

[22] Filed: Jan. 29, 1986

[30] Foreign Application Priority Data

Feb. 5, 1985 [CH] Switzerland .................. 511/85

[51] Int. Cl.$^4$ ............................................. B01D 15/04
[52] U.S. Cl. .................................. 210/668; 210/167; 210/195.1; 210/198.1
[58] Field of Search ............. 210/668, 686, 757, 167, 210/198.1, 290, 669, 194, 195.1, 209

[56] References Cited

U.S. PATENT DOCUMENTS 4,278,635  7/1981  Kerst ................................. 210/757
4,556,492 12/1985  Dickerson et al. ............... 210/669

OTHER PUBLICATIONS

Hawley, *The Condensed Chemical Dictionary*, Van Nostrand Reinhold, N.Y., 1971.

*Primary Examiner*—Ivars Cintins
*Attorney, Agent, or Firm*—Oblon, Fisher, Spivak, McClelland & Maier

[57] ABSTRACT

The removal of elemental oxygen with the aid of a reducing agent from a liquid coolant which circulates in one or more circulations and from which salts are to be removed simultaneously in an ion exchanger mixed-bed filter (5) can be effected without substantial additional expense in terms of apparatus by at least partially loading the anion or cation exchanger resin present in the mixed bed filter (5) with the said reducing agent. The reducing agent is added via a metering means (6) upstream of the mixed-bed filter (5) in the secondary circulation (2).

6 Claims, 1 Drawing Figure

PROCESS FOR THE REMOVAL OF ELEMENTAL OXYGEN BY MEANS OF A REDUCING AGENT IN A COOLANT CIRCULATING IN ONE OR MORE CLOSED CIRCULATIONS, AND APPARATUS FOR THE REMOVAL OF ELEMENTAL OXYGEN

The invention relates to a process for the removal of elemental oxygen in a liquid coolant as defined in the precharacterizing clause of claim 1, and to an apparatus for the removal of elemental oxygen as defined in the precharacterizing clause of claim 5.

In the electrical industry, in particular in the construction of electrical machinery and electrical apparatus, partially or completely closed circulations of a liquid coolant are required in a large number of places. For both electrical reasons and reasons related to corrosion protection, it is necessary in many cases for the coolant, generally water, to be free of oxygen and free of salts. In general, oxygen enters such circulations at expansion vessels, hoses, values and other critical points, and the oxygen suspended and dissolved in the coolant therefore has to be removed continuously.

The removal of salt from the coolant is generally carried out by means of ion exchangers in so-called mixed-bed filters. In order to ensure that the coolant is salt-free in all circumstances, at least some to the coolant must be treated continuously over a mixed-bed filter, in a secondary circulation. If at the same time, for example, hydroquinone-activated hydrazine (tradename: Levoxin) is used as a reducing agent for removing the oxygen, the hydrazine bound in the cation exchanger loses its reducing effect since it is no longer sufficiently activated.

In order to safeguard the reduction of oxygen, it is possible in principle for an additional anion or cation exchanger laden with a suitable reducing agent to be connected upstream or downstream of the mixed-bed filter. However, this entails considerable effort, both in terms of installation and in terms of operation. The regeneration and reloading of this additional ion exchanger complicate the procedure to a significant extent.

It has been proposed that reducing agents, such as $Fe^{2+}$, $Ce^{3+}$, $Sn^{2+}$, $Cu^+$, $SO_3^{2-}$, $SO_2-$ etc. which are bound to ion exchanger resins be used for the reduction of oxygen (see, for example, East German patent specification No. 63,334, East German patent specification No. 47,374 and British patent specification No. 788,112). However, it has been shown that most of these conventional reducing agents possess insufficient activity in a mixed-bed filter. They therefore produce an $O_2$ conversion which is too small to satisfy stringent requirements.

The above statements show that there is a need to improve and to simplify the conventional processes for removal of the salts and the removal of oxygen from the coolant.

It is the object of the invention to provide a process and apparatus for the removal to elemental oxygen by means of a reducing agent from a liquid coolant from which salts have to be removed completely at the same time, where the ion exchanger mixed-bed filters usually present for salt removal are utilized and no substantial additional expense in terms of apparatus or operation should be necessary. The process should be simple to carry out even in existing plants and be particularly suitable for coolant circulations for electric generators, generator stators, rectifiers for generator circuit breakers, and other electrical apparatuses.

The invention is described with reference to the illustrative examples below, which are explained in more detail by means of a FIGURE.

The FIGURE shows a schematic flow chart of a coolant circulation for the removal of salts and the removal of oxygen from the coolant.

The total coolant circulation is divided into a main circulation 1 and a secondary circulation 2. The former contains all the plant 3, that is to say the apparatuses and machines to be cooled, and the appropriate heat exchangers, fittings, etc. Furthermore, a common circulatory pump 4 is provided for both circulations together. 5 represents an ion exchanger mixed-bed filter which is at least partially charged with the reducing agent for oxygen. 6 is the general symbol for a mechanical, hydraulic or mechanical-hydraulic means, not further specified, for metering the reducing agent. In the secondary circulation 2, furthermore, an orifice plate 7 for flow control and a cut-off valve 8 are provided on the inlet side, and a cut-off valve 9 is provided on the outlet side of the ion exchanger mixed-bed filter 5. 10 represents the coolant upstream of the salt removal process and upstream of the oxygen removal process, and 11 represents the coolant downstream of the salt removal process and the oxygen rmoval process.

ILLUSTRATIVE EXAMPLE I

In a coolant circulation as shown in the FIGURE; a 30% strength, aqueous solution of ascorbic acid (vitamin C) was introduced as a reducing agent into the coolant with the aid of a syringe, at the position of the metering means 6. The amount to be metered was matched up with the expected demand and the amount of anion exchanger resin present. In general, 50% of the anion exchanger capacity should not be exceeded.

ILLUSTRATIVE EXAMPLE II

A 15% aqueous solution of hydrazine ($NH_2NH_2$) was injected as a reducing agent into the coolant circulation as shown in the FIGURE, at the position of the means 6, the said solution containing 1%, relative to the amount of hydrazine, of an activating agent. The amount of hydrazine to be metered again depends on the demand and—in this case—on the amount of cation exchanger resin present. A reasonable limit for the amount is about 50% of the cation exchanger capacity.

The invention is not restricted to the examples.

Other possible reducing agents in addition to hydrazine are hydroxylamine ($NH_2OH$) and hydoquinone (1,4-dihydroxybenzene). In the case of the latter, an aqueous solution of not more than 10% strength is recommended.

Suitable activating agents are the following substances:

metal complexes (Co, Fe, etc.) with phthalocyanine and its derivatives 1,1'-dibenzyl-4,4'-bipyridinium salt (benzyl viologen) and other 4,4'-bipyridinium compounds 2,6-diamino-anthraquinone and other anthraquinone derivatives Cu, Pd and other catalytically active matals.

Advantageously, the two last-mentioned metals or metal ions are not mixed with the reducing agent before being metered in, but are introduced first as separate, dilute metal salt solutions.

We claim:

1. Process for the removal of elemental oxygen and salt from a liquid coolant circulating in one or more closed circulation, comprising the sequential steps of (a) branching off continuously or intermittently a secondary circulation from the main circulation, (b) introducing a reducing agent capable of removing oxygen from the liquid coolant into said secondary circulation, (c) passing said liquid coolant in the secondary circulation containing said reducing agent directly into an ion-exchanger mixed-bed filter, and (d) returning the liquid coolant after passage through the ion-exchanger mixed-bed filter to the main circulation, whereby salt and oxygen are simultaneously removed from the system.

2. Process according to claim 1, characterized in that ascorbic acid is used as the reducing agent.

3. Process according to claim 1, characterized in that hydroquinone is used as the reducing agent.

4. Process according to claim 1, characterized in that hydrazine $NH_2NH_2$ hydroxylamine $NH_2OH$ is used as the reducing agent, activation with metal-phthalocyanine complexes, 4,4'-bipyridinium compounds, anthraquinone derivatives or catalytically active metals being carried out in both cases.

5. Apparatus for the removal of elemental oxygen by means of a reducing agent from a liquid coolant circulating in one or more closed circulations, comprising a main circulation (1) and a secondary circulation (2) branched off from said main circulation (1) and which contains an ion exchanger mixed-bed filter (5), a circulatory pump (4) common to both said main and secondary circulations, and a means (6) for metering the reducing agent provided upstream of and communicating directly with the ion exchanger mixed-bed filter (5) in said secondary circulation, and the said means being such that the ion exchanger mixed-bed filter (5) can be laden at least partially with the reducing agent.

6. Apparatus according to claim 5, characterized in that the reducing agent is bound to the anion or cation exchange resin of the ion exchanger mixed-bed filter (5).

* * * * *